(12) United States Patent
Turner et al.

(10) Patent No.: US 11,071,246 B2
(45) Date of Patent: Jul. 27, 2021

(54) SYSTEM AND METHOD FOR MONITORING FLUID CONDUIT CONNECTIONS ON AN AGRICULTURAL MACHINE

(71) Applicant: CNH Industrial Canada, Ltd., Saskatoon (CA)

(72) Inventors: Jack D. Turner, Saskatoon (CA); Gordon Anthony Engel, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 174 days.

(21) Appl. No.: 16/260,556

(22) Filed: Jan. 29, 2019

(65) Prior Publication Data
US 2020/0236840 A1 Jul. 30, 2020

(51) Int. Cl.
*A01C 7/08* (2006.01)
*A01C 7/10* (2006.01)
*A01B 59/04* (2006.01)

(52) U.S. Cl.
CPC ............. *A01C 7/081* (2013.01); *A01B 59/04* (2013.01); *A01C 7/102* (2013.01)

(58) Field of Classification Search
CPC .... A01C 7/16; A01C 7/08; A01C 7/00; A01C 7/20; A01C 14/00; A01C 7/10; A01C 7/102; A01C 7/081; B60B 1/62; B60B 1/58; B60B 1/64; B60B 1/00; G08B 21/18; G08B 21/00; A01B 59/04; A01B 59/00
See application file for complete search history.

(56) References Cited

U.S. PATENT DOCUMENTS

| 5,604,681 | A | 2/1997 | Koeninger |
| 7,253,721 | B2 | 8/2007 | Flohr et al. |
| 7,441,404 | B2 | 10/2008 | Devier et al. |
| 2009/0223096 | A1 | 9/2009 | Wimmer |
| 2011/0057776 | A1 | 3/2011 | Biziorek |

FOREIGN PATENT DOCUMENTS

| CA | 2241523 | 12/1999 |
| EP | 2018981 | 11/2010 |
| WO | WO 2016099257 | 6/2016 |

*Primary Examiner* — Christopher J. Novosad
(74) *Attorney, Agent, or Firm* — Rebecca L. Henkel; Rickard K. DeMille

(57) ABSTRACT

In one aspect, a system for monitoring fluid conduit connections of an agricultural machine may include a first fluid conduit having a first coupling device, a second fluid conduit having a second coupling device, and a third fluid conduit having a third coupling device. Each of the second and third coupling devices may, in turn, include an identification device. A controller of the system may be configured to receive an input from the identification device of one of the second fluid conduit or the third fluid conduit when the respective second coupling device or third coupling device is coupled to the first coupling device. Furthermore, the controller may be configured to identify the one of the second fluid conduit or the third fluid conduit as a connected fluid conduit based on the received input.

18 Claims, 4 Drawing Sheets

SYSTEM AND METHOD FOR MONITORING FLUID CONDUIT CONNECTIONS ON AN AGRICULTURAL MACHINE

FIELD OF THE INVENTION

The present disclosure generally relates to agricultural machines and, more particularly, to systems and methods for monitoring fluid conduit connections on an agricultural machine based on an input(s) received when coupling the fluid conduits.

BACKGROUND OF THE INVENTION

Modern farming practices strive to increase yields of agricultural fields. In this respect, seeders and other agricultural implements are towed behind a tractor or other work vehicle to disperse seed throughout a field. For example, seeders typically include one or more ground engaging tools or openers that form a furrow or trench in the soil. One or more dispensing devices of the seeder may, in turn, deposit the seeds into the furrow(s). After deposition of the seeds, a packer wheel may pack the soil on top of the deposited seeds.

Typically, an air cart is used to meter and deliver seeds to the dispensing devices of a seeder. As such, the air cart may include a fan that generates a flow of pressurized air to the seeds transport the seeds from a hopper of the air cart through a plurality of delivery tubes to the dispensing devices of the seeder. In certain configurations, the fan may be driven or otherwise powered by a flow of fluid (e.g., hydraulic oil) from the tractor or other vehicle towing the air cart. In such configurations, several fluid conduits on the air cart (e.g., a supply conduit, a return conduit, and/or a case drain conduit) must be coupled to corresponding fluid conduits on the tractor for the fan to operate properly. If the conduits on the air cart are incorrectly coupled to the conduits on the tractor (e.g., the supply conduit on the air cart is coupled to the return conduit on the tractor or the case drain line on the air cart is not coupled to the tractor), the fan may be damaged during operation.

Accordingly, an improved system and method for monitoring fluid conduit connections on an agricultural machine would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring fluid conduit connections of an agricultural machine. The system may include a first fluid conduit of the agricultural machine, with the first fluid conduit having a first coupling device. The system may also include a second fluid conduit of the agricultural machine, with the second fluid conduit having a second coupling device configured to be coupled to the first coupling device in a manner that fluidly couples the first and second fluid conduits. The second coupling device may, in turn, include an identification device. Furthermore, the system may include a third fluid conduit of the agricultural machine, with the third fluid conduit having a third coupling device configured to be coupled to the first coupling device in a manner that fluidly couples the first and third fluid conduits. The third coupling device may, in turn, include an identification device. Moreover, the system may include a controller configured to receive an input from the identification device of one of the second fluid conduit or the third fluid conduit when the respective second coupling device or third coupling device is coupled to the first coupling device. Additionally, the controller may be configured to identify the one of the second fluid conduit or the third fluid conduit as a connected fluid conduit based on the received input.

In another aspect, the present subject matter is directed to a system for monitoring fluid conduit connections of an agricultural machine. The system may include a first fluid conduit of the agricultural machine, with the first fluid conduit comprising a first coupling device. The system may also include a second fluid conduit of the agricultural machine, with the second fluid conduit having a second coupling device configured to be coupled to the first coupling device in a manner that fluidly couples the first and second fluid conduits. The second coupling device may, in turn, include an identification device. Furthermore, the system may include a third fluid conduit of the agricultural machine, with the third fluid conduit including a third coupling device. Moreover, the system may include a fourth fluid conduit of the agricultural machine, with the fourth fluid conduit having a fourth coupling device configured to be coupled to the third coupling device in a manner that fluidly couples the third and fourth conduits. The fourth coupling device may, in turn, include an identification device. Additionally, the system may include a controller configured to receive an input from the identification device of the second fluid conduit when the second coupling device is coupled to the first coupling device. The controller may also be configured to receive an input from the identification device of the fourth fluid conduit when the fourth coupling device is received by the third coupling device. Furthermore, the controller may be configured to determine an order in which the second coupling device is coupled to the first coupling device and the fourth coupling device is received by the third coupling device based on the received inputs.

In a further aspect, the present subject matter is directed to a method for monitoring fluid conduit connections of an agricultural machine. The agricultural machine may include a first fluid conduit having a first coupling device and a second fluid conduit having a second coupling device configured to be coupled to the first coupling device in a manner that fluidly couples the first and second fluid conduits. Moreover, the agricultural machine may include a third fluid conduit having a third coupling device configured to be received by the first coupling device in a manner that fluidly couples the first and third fluid conduits. The method may include receiving, with a computing device, an input from one of an identification device associated with the second fluid conduit or an identification device associated with the third fluid conduit when the associated second or third coupling device is coupled to the first coupling device. Furthermore, the method may include identifying, with the computing device, one of the second fluid conduit or the third fluid conduit as a connected fluid conduit based on the received input. Additionally, the method may include initiating, with the computing device, a control action when the connected fluid conduit differs from a predetermined fluid conduit.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
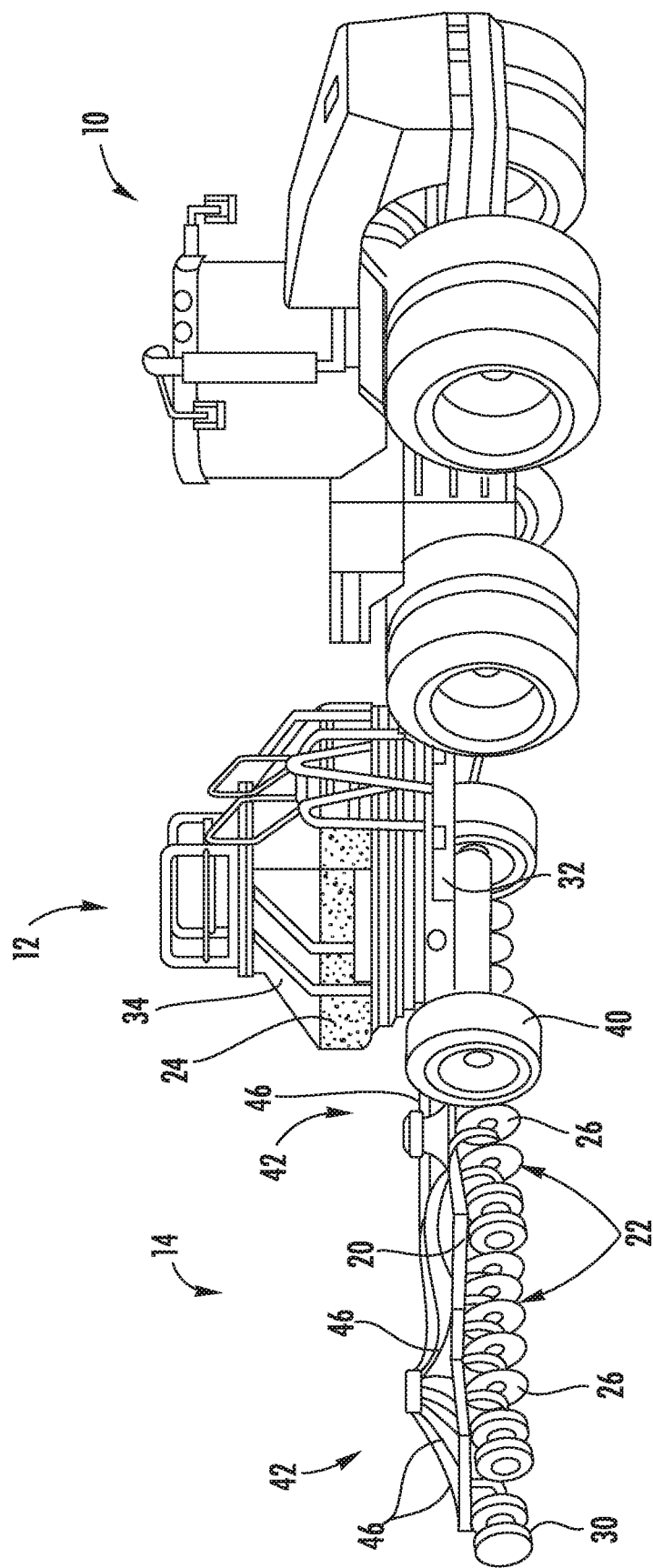
FIG. 1 illustrates a perspective view of one embodiment of a work vehicle, an air cart, and an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring fluid conduit connections of an agricultural machine in accordance with aspects of the present subject matter. Specifically, in several embodiments, the system may include a plurality of fluid conduits configured to be fluidly coupled by associated coupling devices or connectors. As such, in one embodiment, the system may include a first fluid conduit (e.g., a fluid supply conduit of a work vehicle) and second and third fluid conduits (e.g., fluid supply and return conduits of an associated implement). The second and third fluid conduits may, in turn, include corresponding coupling devices configured to mate or otherwise connect to a coupling device of the first fluid conduit. In this regard, when the coupling device of one of the second or third fluid conduits is connected to the coupling device of the first fluid conduit, a controller of the disclosed system may be configured to receive an input from an identification device provided in association with the coupling device of the connected second or third fluid conduit. Such input may, in turn, be indicative of the identity of the corresponding second or third fluid conduit. Based on the received input, the controller may also be configured to determine which one of the second or third fluid conduits has been connected to the first fluid conduit based on the received input. For example, when the coupling device of the second fluid conduit is connected to the coupling device of the first fluid conduit, the controller may receive an input from the identification device of the second fluid conduit. Thereafter, the controller may determine that the second fluid conduit has been connected to the first fluid conduit based on the received input.

The present subject matter will generally be described herein in the context of monitoring fluid conduit connections between a work vehicle, such as a tractor, and an associated air cart. However, it should be appreciated that the disclosed system and method may also be used to monitor fluid conduit connections between any other type of agricultural machine, such as between any other type of work vehicle (e.g., an agricultural harvester, a self-propelled sprayer, and/or the like) and any other type of an agricultural implement (e.g., a tillage implement, seeder, a planter, a fertilizer, and/or the like).

Figure 2:
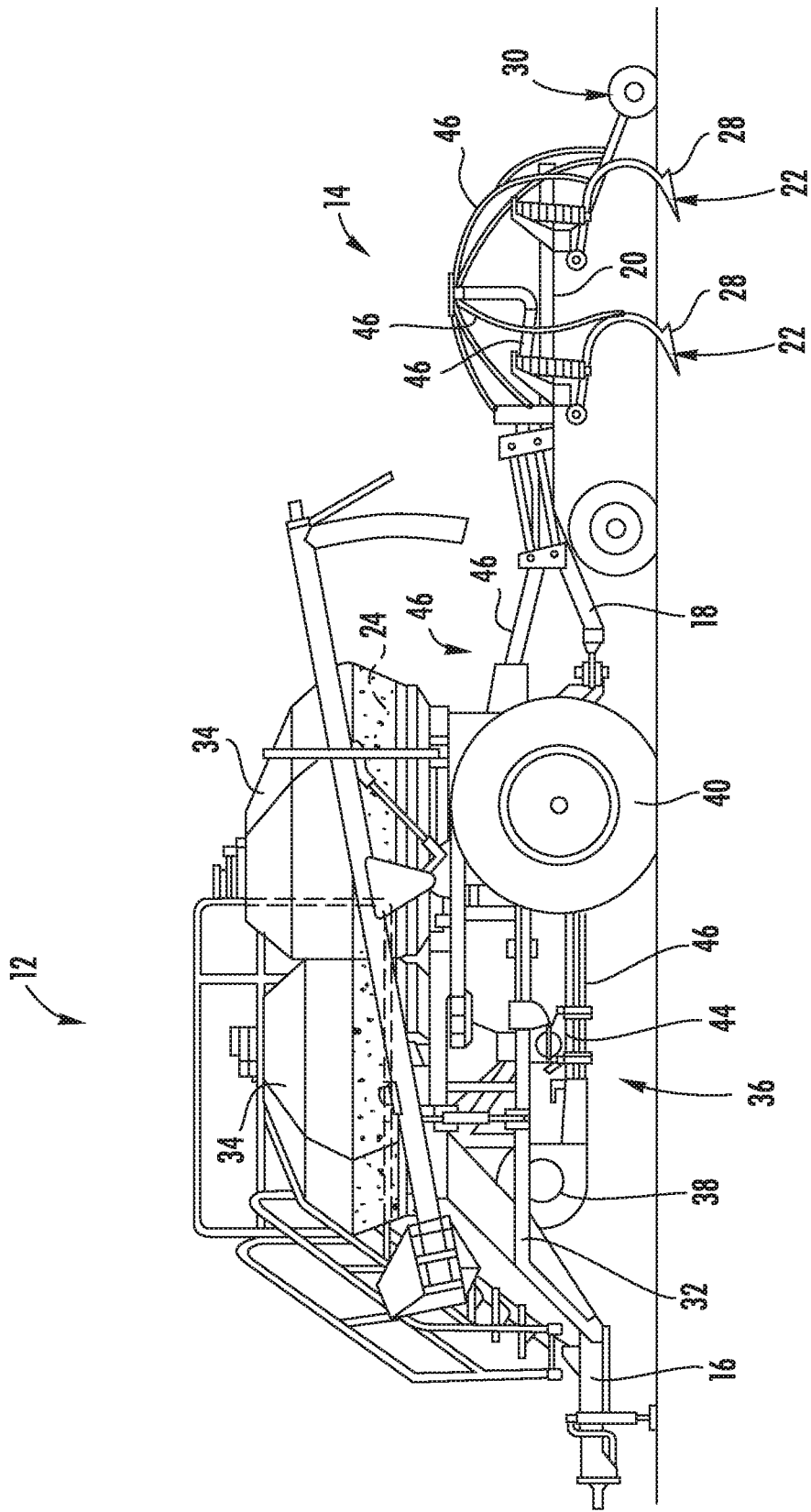
FIG. 2 illustrates a side view of the work vehicle and the air cart shown in FIG. 1 and an alternative embodiment of the implement in accordance with aspects of the present subject matter.

Referring now to FIGS. 1 and 2, embodiments of an agricultural machine including a work vehicle 10, an air cart 12 and an associated implement 14 are illustrated in accordance with aspects of the present subject matter. Specifically, FIG. 1 illustrates a perspective view of the work vehicle 10 towing the air cart 12 and one embodiment of the implement 14. Additionally, FIG. 2 illustrates an enlarged side view of the air cart 12 and another embodiment of the implement 14. It should be appreciated that, although the work vehicle 10 illustrated herein is configured as a tractor, the work vehicle 10 may generally be configured as any suitable work vehicle known in the art, such as any other agricultural vehicle, and/or the like. It should also be appreciated that, although the implement 14 illustrated herein corresponds to a seed drill, the implement 14 may generally correspond to any suitable equipment or implement, such as another seed dispensing implement, a fertilizer dispensing implement, a tillage implement, and/or the like.

As shown, the air cart 12 may be configured to be towed directly behind the work vehicle 10, with the implement 14 being towed behind the air cart 12. In this regard, a hitch assembly 16 (FIG. 2) may be configured to couple the air cart 12 to the work vehicle 10. Although the hitch assembly 16 is illustrated in FIG. 2 as corresponding to a hitch of the air cart 12, the hitch assembly 16 may also correspond to a hitch of the work vehicle 10. Furthermore, a hitch assembly 18 (FIG. 2) may be configured to couple the implement 14 to the air cart 12. Although the hitch assembly 18 is illustrated as corresponding to a hitch of the implement 14, the hitch assembly 18 may also correspond to a hitch of the air cart 12. Additionally, in alternative embodiments, the implement 14 may be towed directly behind the work vehicle 10, with the air cart 12 being towed behind the implement 14. For example, in such embodiments, the implement 14 may be coupled to the work vehicle 10 via the hitch assembly 18 and the air cart 12 may be coupled to the implement 14 via the hitch assembly 16. In a further embodiment, the air cart 12 and the implement 14 may be part of a single unit that is towed behind the work vehicle 10, or elements of a self-propelled vehicle configured to distribute agricultural product across a field.

In several embodiments, the implement 14 may include a frame 20 configured to support or couple to various components of the implement 14, such as one or more ground-engaging tools 22. In general, the ground-engaging tools 22 may be configured to excavate a furrow or trench in the soil to facilitate deposition of a flowable granular or particulate-type agricultural product 24, such as seeds, fertilizer, and/or the like. For example, in the embodiment illustrated in FIG.

1, each ground-engaging tool 22 may be configured as an opening disc 26. Alternatively, in the embodiment shown in FIG. 2, each ground-engaging tool 22 may be configured as a hoe or shank 28. However, it should be appreciated that the ground-engaging tools 22 may be configured as any suitable device for creating a furrow in the soil that is suitable for receiving the agricultural product 24. Furthermore, the implement 14 may generally include any number of ground-engaging tools 22 to facilitate delivery of the agricultural product 24 across a given swath of the soil. For instance, in one embodiment, the implement 14 may include twenty-four ground-engaging tools 22 spaced apart across the width of the implement 14. In alternative embodiments, however, the implement 14 may include any other suitable number of ground-engaging tools 22, such as less than twenty-four ground-engaging tools 22 or more than twenty-four ground-engaging tools 22. Additionally, the implement 14 may also include one or more closing wheels or discs 30 configured to close the furrow after the agricultural product 24 has been deposited into the furrow.

In accordance with aspects of the present disclosure, the air cart 12 may be configured to store the agricultural product 24 to be deposited within the soil. Specifically, in several embodiments, the air cart 12 may include a frame 32 configured to support or couple to various components of the air cart 12. For example, as shown, the frame 32 may be configured to support a hopper or storage tank 34 configured for storing the agricultural product 24 to be deposited within the furrow. In certain configurations, the hopper 34 may include multiple compartments for storing various different agricultural products. For example, one compartment may include seeds, and another compartment may include a dry/granular fertilizer. In some embodiments, the frame 32 may also be configured to support a metering system 36 (FIG. 2) and a fan or pressurized air source 38 (FIG. 2). Additionally, in one embodiment, a plurality of wheels 40 may be coupled to the frame 32 to permit the air cart 12 to be towed across a field by the work vehicle 10.

Furthermore, a plurality of delivery conduits 42 may be configured to convey the agricultural product 24 from the air cart 12 to the implement 14 for deposition into the furrow. Specifically, in several embodiments, the agricultural product 24 contained within the hopper 34 may be gravity fed into the metering system 36. As such, the metering system 36 may be configured to distribute a desired quantity of the agricultural product 24 to the delivery conduits 42. For example, in one embodiment, a primary header 44 (FIG. 2) coupled between the metering system 36 and the delivery conduits 42 may direct the agricultural product 24 into each of the delivery conduits 42. Pressurized air provided by the fan 38 to the delivery conduits 42 may then carry the agricultural product 28 through the delivery conduits 46 to the implement 14.

It should be appreciated that the configuration of the work vehicle/air cat/implement 10/12/14 described above and shown in FIGS. 1 and 2 is provided only to place the present subject matter in an exemplary field of use. Thus, it should be appreciated that the present subject matter may be readily adaptable to any manner of agricultural machine configuration.

Figure 3:
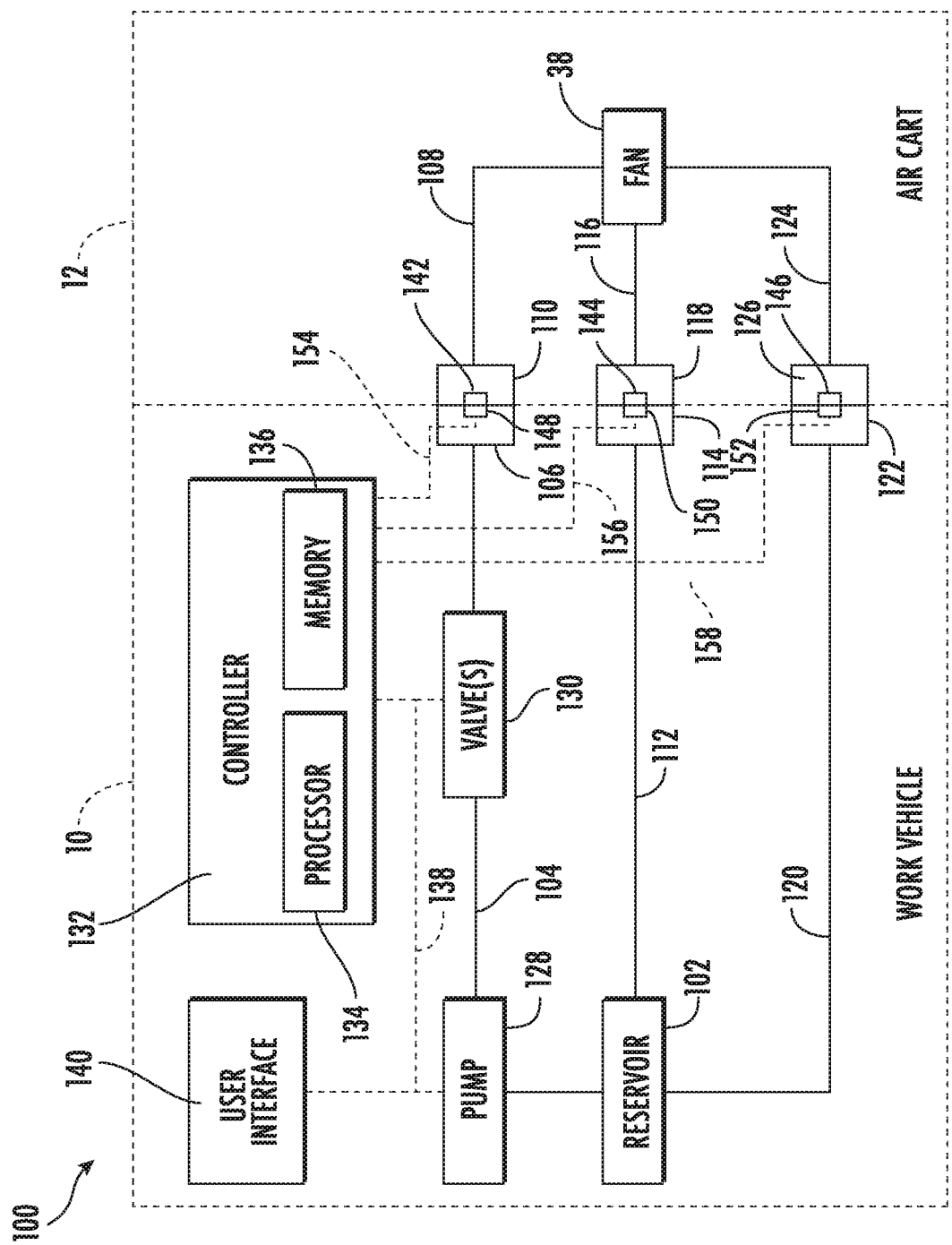
FIG. 3 illustrates a schematic view of one embodiment of a system for monitoring fluid conduit connections of an agricultural machine in accordance with aspects of the present subject matter.
Figure 4:
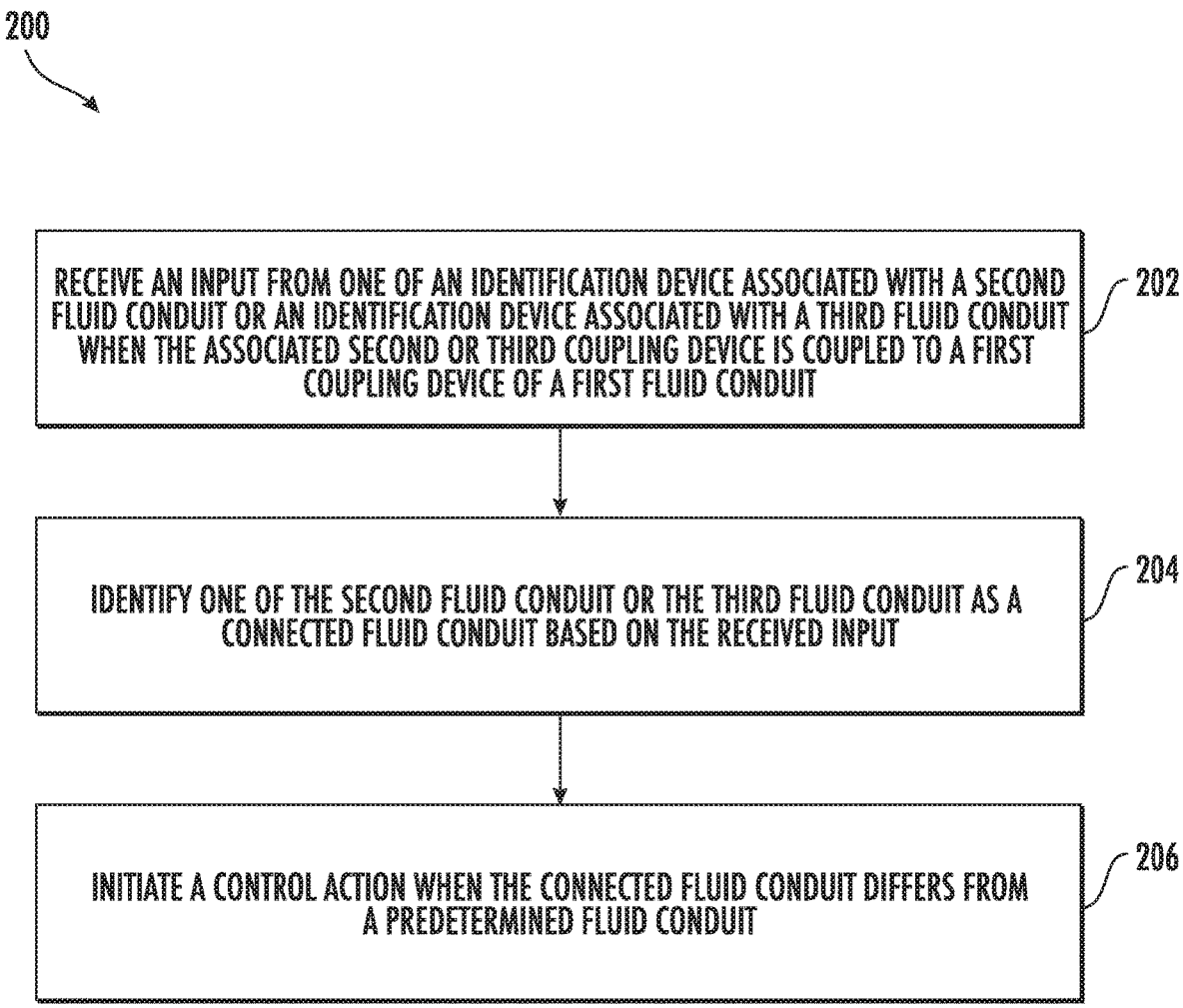
FIG. 4 illustrates a flow diagram of one embodiment of a method for monitoring fluid conduit connections of an agricultural machine in accordance with aspects of the present subject matter.

Referring now to FIG. 3, a schematic view of one embodiment of a system 100 for monitoring fluid conduit connections of an agricultural machine is illustrated in accordance with aspects of the present subject matter. In general, the system 100 will be described herein with reference to the work vehicle/air cart/implement 10/12/14 described above with reference to FIGS. 1 and 2. However, it should be appreciated by those of ordinary skill in the art that the disclosed system 100 may generally be utilized with agricultural machines having any other suitable machine configuration. Additionally, it should be appreciated that the communicative links or electrical couplings of the system 100 shown in FIG. 4 are indicated by dashed lines. Conversely, the fluid conduits of the system 100 shown in FIG. 4 are indicated by solid lines.

As shown in FIG. 3, the system 100 may be configured to provide a fluid flow from a reservoir 102 on the work vehicle 10 to the fan 38 on the air cart 12. In several embodiments, the fan 38 may be driven or otherwise powered by the fluid flow (e.g., a flow of pressurized hydraulic oil) from the work vehicle 10. In this regard, the system 100 may include a plurality of fluid conduits configured to convey the fluid flow between the reservoir 102 and the fan 38. For example, in one embodiment, the system 100 may include a vehicle supply conduit 104 having a vehicle supply conduit coupling device 106 and an air cart supply conduit 108 having an air cart supply conduit coupling device 110. The coupling devices 106, 110 may, in turn, be configured to be connected or otherwise coupled (e.g., one of the coupling devices 106, 110 may be received by the other coupling device 106, 110) in a manner that fluidly couples the vehicle and air cart supply conduits 104, 108. As such, the supply conduits 104, 108 may be configured to convey the fluid flow from the reservoir 102 to the fan 38 in a manner that drives the fan 38 such that the flow of pressurized air is produced. The system 100 may also include a vehicle return conduit 112 having a vehicle return conduit coupling device 114 and an air cart return conduit 116 having an air cart return conduit coupling device 118. The coupling devices 114, 118 may, in turn, be configured to be connected or otherwise coupled in a manner that fluidly couples the vehicle and air cart supply conduits 112, 116. As such, the return conduits 112, 114 may be configured to convey the fluid flow used to drive the fan back to the reservoir 102. Additionally, the system 100 may include a vehicle case drain conduit 120 having a vehicle case drain conduit coupling device 122 and an air cart case drain conduit 124 having an air cart case drain conduit coupling device 126. The coupling devices 122, 126 may, in turn, be configured to be connected or otherwise coupled in a manner that fluidly couples the vehicle and air cart case drain conduits 120, 124. In this respect, the case drain conduits 120, 124 may be configured to convey any internal fluid leakage within the fan 38 (e.g., fluid leakage used for lubrication) back to the reservoir 102. However, in alternative embodiments, any other suitable configuration of fluid conduits and fluid conduit coupling devices may be used to convey fluid between the reservoir 102 and the fan 38.

It should be appreciated that the coupling devices 106, 110, 114, 118, 122, 126 may generally correspond to any suitable devices configured to fluidly couple the corresponding conduits. For example, in one embodiment, the coupling devices 106, 110, 114, 118, 122, 126 may correspond to quick-disconnect-type connectors. However, in alternative embodiments, the coupling devices 106, 110, 114, 118, 122, 126 may correspond to any other suitable type of connector or device, such as threaded connectors.

Furthermore, the system 100 may include any suitable fluid-related components for controlling the fluid flow between the reservoir 102 and the fan 38. For example, as shown in FIG. 3, the system 100 may include a pump 128 of the work vehicle 10, with the pump 128 configured to pump or otherwise supply fluid from the reservoir 102 to the vehicle supply conduit 108. Moreover, the system 100 may include one or more valves 130 of the work vehicle 10, with the valve(s) 130 configured to adjust the flow of fluid through the vehicle supply conduit 108. For instance, in several embodiments, the valve(s) 130 may be configured to selectively occlude the flow of fluid through the vehicle supply conduit 104 such that the flow of fluid through the conduit 104 is disabled. Additionally, in one embodiment, the valve(s) 130 may also be configured to adjust one or more flow parameters (e.g., the flow rate or pressure) of the fluid flowing through the vehicle supply conduit 104. It should be appreciated that the valve(s) 130 may be configured as any suitable valve(s) on the work vehicle 10. For example, in several embodiments, the valve(s) 130 may be configured as one or more electro-hydraulic remote (EHR) valve blocks.

In accordance with aspects of the present subject matter, the system 100 may include a controller 132 positioned on and/or within or otherwise associated with the vehicle 10, air cart 12, or implement 14. In general, the controller 132 may comprise any suitable processor-based device known in the art, such as a computing device or any suitable combination of computing devices. Thus, in several embodiments, the controller 132 may include one or more processor(s) 134 and associated memory device(s) 136 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 136 of the controller 132 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 136 may generally be configured to store suitable computer-readable instructions that, when implemented by the processor(s) 134, configure the controller 132 to perform various computer-implemented functions. Although the controller 132 is illustrated as being installed on the work vehicle 10 in FIG. 3, it should be appreciated that the controller 132 may be installed on the air cart 12 or the implement 14 in other embodiments.

In addition, the controller 132 may also include various other suitable components, such as a communications circuit or module, a network interface, one or more input/output channels, a data/control bus and/or the like, to allow controller 132 to be communicatively coupled to any of the various other system components described herein (e.g., the pump 128 and/or the valve(s) 130). For instance, as shown in FIG. 3, a communicative link or interface 138 (e.g., a data bus) may be provided between the controller 132 and the components 128, 130 to allow the controller 132 to communicate with such components 128, 130 via any suitable communications protocol (e.g., CANBUS).

It should be appreciated that the controller 132 may correspond to an existing controller(s) of the vehicle 10, the air cart 12, and/or the implement 14, itself, or the controller 132 may correspond to a separate processing device. For instance, in one embodiment, the controller 132 may form all or part of a separate plug-in module that may be installed in association with the vehicle 10, the air cart 12, and/or the implement 14 to allow for the disclosed systems to be implemented without requiring additional software to be uploaded onto existing control devices of the vehicle 10, the air cart 12, and/or the implement 14. It should also be appreciated that the functions of the controller 132 may be performed by a single processor-based device or may be distributed across any number of processor-based devices, in which instance such devices may be considered to form part of the controller 132. For instance, the functions of the controller 132 may be distributed across multiple application-specific controllers, such as a pump controller, an EHR controller, an air cart controller, an implement controller, and/or the like.

Furthermore, in one embodiment, the system 100 may also include a user interface 140. More specifically, the user interface 140 may be configured to provide feedback (e.g., feedback associated with the fluid conduit connections) to the operator of the vehicle/air cart/implement 10/12/14. As such, the user interface 140 may include one or more feedback devices (not shown), such as display screens, speakers, warning lights, and/or the like, which are configured to provide feedback from the controller 132 to the operator. The user interface 140 may, in turn, be communicatively coupled to the controller 132 via the communicative link 138 to permit the feedback to be transmitted from the controller 132 to the user interface 140. In addition, some embodiments of the user interface 140 may include one or more input devices (not shown), such as touchscreens, keypads, touchpads, knobs, buttons, sliders, switches, mice, microphones, and/or the like, which are configured to receive user inputs from the operator.

Additionally, the system 100 may include one or more identification devices and associated identification device reader(s) configured to provide an input(s) to the controller 132 associated with the identities of the connected fluid conduits. Specifically, in several embodiments, an identification device may be integrated into or otherwise provided in association with the coupling devices of one of the work vehicle 10 or the air cart 12. Moreover, an identification device reader communicatively coupled to the controller 132 may be integrated into or otherwise provided in operative association with the coupling devices of the other of the work vehicle 10 or the air cart 12. As such, when a coupling device(s) on the air cart 12 is connected to a coupling device(s) on the work vehicle 10, the corresponding identification device(s) and identification device reader(s) may communicate with each other in a manner that communicatively coupled the identification device(s) to the controller 132. Once communicatively coupled to the controller 132, the identification device(s) may, in turn, be configured to transmit or otherwise provide an input(s) to the controller 132 associated with the identity of the connected fluid conduits.

As shown in FIG. 3, in one embodiment, the identification devices may be integrated into the coupling devices 110, 118, 126 on the air cart 12, while the identification device readers may be integrated into the coupling devices 106, 114, 122 on the work vehicle 10. Specifically, in such embodiment, the air cart supply conduit coupling device 110, the air cart return conduit coupling device 118, and the air cart case drain conduit coupling device 126 may include corresponding identification devices 142, 144, 146, respectively. Furthermore, the vehicle supply conduit coupling device 106, the vehicle return conduit coupling device 114, and the vehicle case drain conduit coupling device 122 may include corresponding identification device readers 148, 150, 152. The identification device readers 148, 150, 152 may, in turn, be communicatively coupled to the controller 132 via communicative links or interfaces 154, 156, 158, respectively. As such, when one of the coupling devices 110, 118, 126 on the air cart 12 is connected to one of the coupling devices 106, 114, 122 on the work vehicle 10, the corresponding identification device reader communicates with the corresponding identification device such that the associated input is transmitted to the controller 132. For example, when the air cart supply conduit coupling device 110 is connected to the vehicle supply conduit coupling device 106, the identification device reader 148 may communicate with the identification device 142 such that an input associated with the vehicle supply conduit 108 is transmitted from the identification device 142 to the controller 132 via the communicative link 154. In alternative embodiments, the identification devices may be integrated into the coupling devices 106, 114, 122 of the vehicle 10 and the identification device readers may be integrated into the coupling devices 110, 118, 126 of the air cart 12.

It should be appreciated that the identification device(s) and the identification device reader(s) may be any suitable devices that provides an input(s) associated with the identity(ies) of the connected fluid conduits. For example, in one embodiment, each identification device may correspond to a resistor having a unique resistance value, with such resistance value being indicative of the identity of the associated fluid conduit. In such embodiment, each identification device reader may correspond to an electric circuit that is communicatively coupled to the controller 132. As such, when a pair of coupling devices is connected, the corresponding resistor may complete the corresponding electric circuit such that the controller 132 receives a voltage signal indicative of the identity of the connected fluid conduit. In another embodiment, each identification device may be configured as a radio frequency identification (RFID) tag, with the tag storing the input associated the identity of the connected fluid conduit. In such embodiment, each identification device reader may be configured as RFID reader. In this regard, when a pair of coupling devices is connected, the RFID tag may be positioned adjacent to an associated RFID reader such that the RFID reader may "read" the RFID tag and transmit the stored input to the controller 132. However, in alternative embodiments, the identification device(s) and/or the identification device reader(s) may have any other suitable configuration.

Additionally, it should be appreciated that the input(s) associated with the connected fluid conduits may correspond to any suitable characteristic or parameter of the connected fluid conduits. For example, each input may be the type of the fluid conduit (e.g., a supply conduit, a return conduit, a case drain conduit, and/or the like). In another embodiment, each input may be the type of fluid conduit on a specific agricultural machine (e.g., a supply conduit for a fan on a specific manufacturer/model of air cart). However, in alternative embodiments, the input(s) may be any other suitable information that permits the controller 132 to identify the connected fluid conduits.

In several embodiments, the controller 132 may be configured to receive an input(s) from one or more identification devices of the system 100 when one or more pairs of coupling devices are connected. Specifically, the operator of the vehicle/air cart/implement 10/12/14 may be required to connect one or more coupling devices on the air cart 12 to corresponding coupling device(s) on the work vehicle 10 to provide the necessary fluid flow to drive the fan 38 of the air cart 12. In this regard, when the operator connects one or more the coupling devices on the air cart 12 to a coupling device(s) on the work vehicle 10, the identification device reader(s) of the connected coupling device(s) on the work vehicle 10 may communicate with the identification device readers(s) of the connected coupling device(s) on the air cart 12. As such, the identification device(s) may be configured to transmit or otherwise provide an input(s) associated with the identity of connected fluid conduits on the air cart 12 to the controller 132. As mentioned above, in one embodiment, the identification device(s) may be configured as a resistor(s) and the identification device reader(s) may be configured as an electrical circuit(s). In such embodiment, when the coupling devices are connected, the resistor(s) may complete an electrical circuit(s) with the controller 132. In such instances, the controller 132 may receive a voltage signal(s) from the resistor(s), with such voltage being indicative of the identity(ies) of connected fluid conduits. Moreover, as mentioned above, in another embodiment, the identification device(s) may be configured as an RFID tag(s) in the identification device reader(s) may be configured as an RFID reader(s). In such embodiment, when the coupling devices are connected, the RFID reader(s) may "read" the RFID tag(s) such that the input(s) associated with the identity(ies) of the connected fluid conduits are transmitted to the controller 132.

Furthermore, in several embodiments, the controller 132 may be configured to identify the connected fluid conduits based on the input(s) received from the identification device(s). In one embodiment, the controller 132 may be configured to identify when a fluid conduit on the air cart 12 has been connected to one of the fluid conduits on the work vehicle 10 without determining the specific identity of the fluid conduit on the air cart 12 that has been connected. More specifically, the controller 132 may be configured to determine which of the identification device readers on the work vehicle have communicated with an identification device on the air cart 12. As such, the controller 132 may determine that a fluid conduit on the work vehicle 10 is connected to a fluid conduit on the air cart 12 when the corresponding identification device reader communicates with an identification device. For example, in such embodiment, when the identification device reader 148 communicates with any one of the identification devices 142, 144, 146, the controller 132 may determine that the vehicle supply conduit 104 has been connected to one of the fluid conduits on the air cart 12.

Moreover, the controller 132 may be configured to determine the specific identity of the connected fluid conduits based on the input(s) received from the identification device(s). As described above, the input(s) received from the identification device(s) may generally be indicative of the identity of the connected fluid conduit(s). As such, the controller 132 may be configured to analyze/process the received input(s) to determine the determine the identity of the connected fluid conduit(s). In this regard, the controller 132 may include a look-up table(s), suitable mathematical formula, and/or algorithms stored within its memory 136 that correlates the received data to the identity(ies) of the connected fluid conduits. For instance, when the air cart supply conduit coupling device 110 is connected to the vehicle supply conduit coupling device 106, the identification device reader 148 may communicate with the identification device 142 such that the controller 132 receives input associated with the air cart supply conduit 108. Thereafter, the controller 132 may determine that the vehicle and air cart supply conduits 104, 108 have been connected since the controller 132 has received an input associated with the air cart supply conduit 108 from the identification device reader 148 associated with the vehicle supply conduit 104.

Additionally, the controller 132 may be configured to determine the order in which the fluid conduits on the air cart 12 have been connected fluid conduits on the work vehicle 10. As described above, the controller 132 may identify the fluid conduits of the work vehicle 10 to which fluid conduits on the air cart 12 have been connected based on the inputs received from the corresponding identification devices. In this regard, the controller 132 may be configured to record the time when it was determined that each fluid conduit on the work vehicle 10 was connected to a fluid conduit on the air cart 12. Thereafter, the controller 132 may compare the times at which each fluid conduit on the work vehicle 10 was connected to one of the fluid conduits on the air cart 12 to determine the order in which the fluid conduits were connected. For example, in one embodiment, the controller 132 may be configured to store the times at which each connection was made in its memory 136. Once all of the fluid conduits on the work vehicle 10 are connected to a fluid conduit on the air cart 12, the controller 132 may determine the order in which such connections were made based on the stored times.

In the configuration of the system 100 shown in FIG. 3, the vehicle and air cart supply conduits 104, 108 are connected to each other, the vehicle and air cart return conduits 112, 116 are connected to each other, and the vehicle and air cart case drain conduits 120, 124 are connected to each other. It may be assumed that the supply conduits 104, 108 were connected at a first time, the return conduits 112, 116 were connected at a second time, and the case drain conduits 120, 124 were connected at a third time, with the first time being before the second time and the second time being before the third time. In such instance, the controller 132 may compare the first, second, and third times to determine that the supply conduits 104, 108 were connected first, the return conduits 112, 116 were connected second, in the case drain conduits 120, 124 were connected third.

In accordance with aspects of the present subject matter, the controller 132 may be configured to initiate one or more control actions when the fluid conduits on the air cart 12 are improperly connected to the fluid conduits on the work vehicle 10. As indicated above, the fan 38 of the air cart 12 may be damaged when the fluid conduits on the work vehicle 10 in the air cart 12 are improperly connected. The fluid conduits may be improperly connected when one or more fluid conduits on the work vehicle 10 are not connected to a fluid conduit on the air cart 12 (e.g., the vehicle case drain conduit 120 is not connected to the air cart case drain conduit 124), are connected to the wrong fluid conduits on the air cart 12 (e.g., the vehicle supply conduit 104 is connected to the fan return conduit 116), and/or are the connected to the correct fluid conduits on the air cart 12, but in the wrong order. In this regard, the controller 132 may be configured to compare the determined identity (either which fluid conduits of the work vehicle 10 have been coupled to a fluid conduit of the air cart 12 or the specific identity of the fluid conduits of the air cart 12 coupled to the fluid conduits of the work vehicle 10) and/or order in which the fluid conduit connections were made to a predetermined identity and/or order. Thereafter, when the determined identity and/or order differs from the predetermined identity and/or order (thereby indicating that the fluid connections between the work vehicle 10 and the air cart 12 were improperly made), the controller 132 may be configured to initiate one or more control actions associated with preventing the operation of one or more components of the work vehicle 10 and/or the air cart 12 (e.g., the fan 38).

In several embodiments, when the fluid conduits on the air cart 12 are improperly connected to the fluid conduits on the work vehicle 10, the controller 132 may be configured to notify the operator of work vehicle/air cart/implement 10/12/14 that the fluid connections between the work vehicle 10 and the air cart 12 were improperly made. Specifically, in one embodiment, the controller 132 may be configured to transmit instructions to the user interface 140 (e.g., the communicative link 138) instructing the user interface 140 to provide a notification to the operator of the work vehicle/air cart/implement 10/12/14 (e.g., by causing a visual or audible notification or indicator to be presented to the operator) indicating that the fluid conduits on the air cart 12 have been improperly connected to the fluid conduits on the work vehicle 10. For example, in one embodiment, the user interface 140 may provide an indication why the fluid conduits on the air cart 12 improperly connected to the fluid conduits on the work vehicle 10 (e.g., a fluid conduit(s) on the work vehicle 10 is not to a fluid conduit(s) on the air cart 12, is connected to the wrong fluid conduit(s) on the air cart 12, and/or is connected to the fluid conduit(s) on the air cart 12 in the wrong order). In such instances, the operator may then choose to initiate any suitable corrective action he/she believes is necessary, such as disconnecting the improper fluid conduit connections and reconnecting them in the current manner.

Moreover, in several embodiments, the controller 132 may be configured to automatically disable the flow of fluid between the reservoir 102 and the air cart 12 when the fluid conduits on the air cart 12 are improperly connected to the fluid conduits on the work vehicle 10. Specifically, in one embodiment, the controller 132 may be configured to control the operation of the pump 128 and/or the valve(s) 130 in a manner that disables the flow of fluid between the reservoir 102 and the fan 38. For example, the controller 132 may be configured transmit instructions to the pump 128 and/or the valve(s) 130 (e.g., via the communicative link 138) instructing the pump 128 and/or the valve(s) 130 to disable the flow of fluid through the vehicle supply conduit 104, such as by shutting off the pump 128 and/or closing the valve(s) 130.

Furthermore, in one embodiment, the controller 132 may be configured to adjust one or more flow parameters of the fluid flow being supplied to the air cart 12 based on the identity(ies) the fluid conduit(s) of the air cart 12 that has been connected to the work vehicle 10. As described above, the controller 132 may be configured to identify the fluid conduit(s) of the air cart 12 that has been connected to the work vehicle 10 based on input(s) received from the corresponding identification device(s). Once the identity(ies) of the fluid conduit(s) of the air cart 12 connected to the work vehicle 10 have been determined, the controller 132 may be configured to access a flow parameter data set stored within its memory 136. The flow parameter data set may, in turn, include the values of one or more flow parameters (e.g., pressure, flow rate, and/or the like) of the fluid flow provided to the air cart 12 when the identified fluid conduit(s) of the air cart 12 were previously connected to the work vehicle 10. Thereafter, the controller 132 may be configured to control the operation of the pump 128 and/or the valve(s) 130 (e.g., via the communicative link 138) such that the flow parameter(s) of the fluid flow provided to the fan 38 correspond to the value(s) of such flow parameter(s) provided by the retrieved data set. Additionally, if the operator of the work vehicle/air cart/implement 10/12/14 adjusts one or more of the flow parameters during operation of the work vehicle/air cart/implement 10/12/14, the controller 132 may be configured to update the flow parameter data set stored in its memory 136. In this regard, the next time the current configuration of fluid conduit connections is made, the controller 132 may be configured to set the flow parameter(s) of the fluid flow provided to the air cart 12 based on the updated flow parameter value(s).

It should be appreciated that each flow parameter data set may correspond to any suitable data structure. In several embodiments, each flow parameter data set may be configured as a suitable look-up table(s). For example, each look-up table may include a first column containing a plurality of fluid conduit connection configurations. Furthermore, each look-up table may include a second column containing a plurality of flow parameter values, with each value corresponding to one of the connection configurations. Moreover, one look-up table may be provided for each flow parameter (e.g., one look-up table for flow rate and another look-up table for pressure). However, in alternative embodiments, each flow parameter data set may correspond to a graph, chart, map, and/or any other suitable type of data structure.

Referring now to FIG. 5, a flow diagram of one embodiment of a method 200 for monitoring fluid conduit connections of an agricultural machine is illustrated in accordance with aspects of the present subject matter. In general, the method 200 will be described herein with reference to the work vehicle/air cart/implement 10/12/14 and the system 100 described above with reference to FIGS. 1-4. However, it should be appreciated by those of ordinary skill in the art that the disclosed method 200 may generally implemented with any agricultural machine having any suitable machine configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving, with a computing device, an input from one of an identification device associated with a second fluid conduit or an identification device associated with a third fluid conduit when the associated second or third coupling device is received by a first coupling device of a first fluid conduit. For instance, as described above, the controller 132 may be configured to receive an input from the identification device 142, 144, 146 associated with one of the fluid conduits 108, 116, 124 when the corresponding coupling device 110, 118, 126 is connected to one of the coupling devices 106, 114, 122 of the fluid conduits 104, 112, 120.

Additionally, at (204), the method 200 may include identifying, with the computing device, one of the second fluid conduit or the third fluid conduit as a connected fluid conduit based on the received input. For instance, as described above, the controller 132 may be configured to identify one of the fluid conduit 108, 116, 124 is being connected to one of the coupling devices 106, 114, 122 based on the received input.

Moreover, as shown in FIG. 5, at (206), the method 200 may include initiating, with the computing device, a control action when the connected fluid conduit differs from a predetermined fluid conduit. For instance, as described above, when the identified connected fluid conduit differs from a predetermined fluid conduit, the controller 132 may be configured to initiate one or more control actions, such as notifying an operator of the work vehicle/air cart/implement 10/12/14 and/or disabling the flow of fluid to the identified connected fluid conduit.

It is to be understood that the steps of the method 200 are performed by the controller 132 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 132 described herein, such as the method 200, is implemented in software code or instructions which are tangibly stored on a tangible computer readable medium. The controller 132 loads the software code or instructions via a direct interface with the computer readable medium or via a wired and/or wireless network. Upon loading and executing such software code or instructions by the controller 132, the controller 132 may perform any of the functionality of the controller 132 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring fluid conduit connections of an agricultural machine, the system comprising:
    a first fluid conduit of the agricultural machine, the first fluid conduit comprising a first coupling device;
    a second fluid conduit of the agricultural machine, the second fluid conduit comprising a second coupling device configured to be coupled to the first coupling device in a manner that fluidly couples the first and second fluid conduits, the second coupling device including an identification device;
    a third fluid conduit of the agricultural machine, the third fluid conduit comprising a third coupling device configured to be coupled to the first coupling device in a manner that fluidly couples the first and third fluid conduits, the third coupling device including an identification device; and
    a controller configured to:
        receive an input from the identification device of one of the second fluid conduit or the third fluid conduit when the respective second coupling device or third coupling device is coupled to the first coupling device; and identify the one of the second fluid conduit or the third fluid conduit as a connected fluid conduit based on the received input;

compare the connected fluid conduit to a predetermined fluid conduit; and initiate a control action when the connected fluid conduit differs from the predetermined fluid conduit.

2. The system of claim 1, wherein the control action comprises providing a notification to an operator of the agricultural machine that the connected fluid conduit differs from the predetermined fluid conduit.

3. The system of claim 1, wherein the control action comprises disabling a flow of fluid to the connected fluid conduit.

4. The system of claim 1, wherein the controller is further configured to adjust a flow parameter of fluid being provided to the first fluid conduit based on the connected fluid conduit.

5. The system of claim 4, wherein the controller is further configured to adjust a flow parameter of fluid being provided to the first fluid conduit based on a value of the flow parameter that was recorded when the connected fluid conduit was previously fluidly coupled to the first fluid conduit.

6. The system of claim 1, wherein the identification devices correspond to resistors.

7. A system for monitoring fluid conduit connections of an agricultural machine, the system comprising:
a first fluid conduit of the agricultural machine, the first fluid conduit comprising a first coupling device;
a second fluid conduit of the agricultural machine, the second fluid conduit comprising a second coupling device configured to be coupled to the first coupling device in a manner that fluidly couples the first and second fluid conduits, the second coupling device including an identification device;
a third fluid conduit of the agricultural machine, the third fluid conduit comprising a third coupling device;
a fourth fluid conduit of the agricultural machine, the fourth fluid conduit comprising a fourth coupling device configured to be coupled to the third coupling device in a manner that fluidly couples the third and fourth fluid conduits, the fourth coupling device including an identification device; and
a controller configured to:
receive an input from the identification device of the second fluid conduit when the second coupling device is coupled to the first coupling device;
receive an input from the identification device of the fourth fluid conduit when the fourth coupling device is coupled to the third coupling device; and
determine an order in which the second coupling device is coupled to the first coupling device and the fourth coupling device is coupled to the third coupling device based on the received inputs.

8. The system of claim 7, wherein the controller is further configured to compare the determined order to a predetermined order and initiate a control action when the determined order differs from the predetermined order.

9. The system of claim 8, wherein the control action comprises providing a notification to an operator of the agricultural machine that the determined order differs from the predetermined order.

10. The system of claim 8, wherein the control action comprises disabling a flow of fluid to at least one of the second fluid conduit or the fourth fluid conduit.

11. The system of claim 7, wherein the controller is further configured to:
adjust a flow parameter of fluid being provided to the first fluid conduit based on the second fluid conduit; and
adjust a flow parameter of fluid being provided to the third fluid conduit based on the fourth fluid conduit.

12. The system of claim 11, wherein the controller is further configured to:
adjust a flow parameter of fluid being provided to the first fluid conduit based on a value of the flow parameter that was recorded when the second fluid conduit was previously fluidly coupled to the first fluid conduit; and
adjust a flow parameter of fluid being provided to the third fluid conduit based on a value of the flow parameter that was recorded when the fourth fluid conduit was previously fluidly coupled to the third fluid conduit.

13. The system of claim 7, wherein the identification devices correspond to resistors.

14. A method for monitoring fluid conduit connections of an agricultural machine, the agricultural machine comprising a first fluid conduit including a first coupling device, a second fluid conduit including a second coupling device configured to be coupled to the first coupling device in a manner that fluidly couples the first and second fluid conduits, and a third fluid conduit including a third coupling device configured to be coupled to the first coupling device in a manner that fluidly couples the first and third fluid conduits, the method comprising:
receiving, with a computing device, an input from one of an identification device associated with the second fluid conduit or an identification device associated with the third fluid conduit when the associated second or third coupling device is coupled to the first coupling device;
identifying, with the computing device, one of the second fluid conduit or the third fluid conduit as a connected fluid conduit based on the received input; and
initiating, with the computing device, a control action when the connected fluid conduit differs from a predetermined fluid conduit.

15. The method of claim 14, wherein the control action comprises providing a notification to an operator of the agricultural machine that the connected fluid conduit differs from the predetermined fluid conduit.

16. The method of claim 14, wherein the control action comprises disabling a flow of fluid to the second fluid conduit.

17. The method of claim 14, further comprising:
adjusting, with the computing device, a flow parameter of fluid being provided to the first fluid conduit based on the connected fluid conduit.

18. The method of claim 17, further comprising:
adjusting, with the computing device, a flow parameter of fluid being provided to the first fluid conduit based on a value of the flow parameter that was recorded when the connected fluid conduit was previously fluidly coupled to the first fluid conduit.

* * * * *